United States Patent
Grasruck et al.

(10) Patent No.: US 7,903,860 B2
(45) Date of Patent: Mar. 8, 2011

(54) METHOD AND DEVICE FOR SEGMENTING AT LEAST ONE SUBSTANCE IN AN X-RAY IMAGE

(75) Inventors: Michael Grasruck, Erlangen (DE); Karl Stierstorfer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1011 days.

(21) Appl. No.: 11/581,149

(22) Filed: Oct. 16, 2006

(65) Prior Publication Data
US 2007/0092127 A1 Apr. 26, 2007

(30) Foreign Application Priority Data
Oct. 17, 2005 (DE) .......... 10 2005 049 602

(51) Int. Cl.
*G06K 9/56* (2006.01)
(52) U.S. Cl. ......... 382/132; 382/205
(58) Field of Classification Search .......... 600/300; 382/100, 128, 129, 130, 131, 132, 133, 134, 382/173, 181; 128/920; 378/1, 37, 21, 41, 378/42, 38, 44, 51
See application file for complete search history.

(56) References Cited

U.S. PATENT DOCUMENTS

| | | | | |
|---|---|---|---|---|
| 6,035,014 A * | 3/2000 | Hiraoglu et al. | ............ | 378/57 |
| 6,076,400 A * | 6/2000 | Bechwati et al. | ............ | 73/433 |
| 6,463,167 B1 * | 10/2002 | Feldman et al. | ............ | 382/128 |
| 6,754,298 B2 | 6/2004 | Fessler | | |
| 7,120,276 B1 * | 10/2006 | Brady et al. | ............ | 382/107 |
| 2003/0099385 A1 * | 5/2003 | Zeng et al. | ............ | 382/128 |
| 2003/0152258 A1 * | 8/2003 | Jabri et al. | ............ | 382/132 |
| 2004/0028181 A1 * | 2/2004 | Charles, Jr. et al. | ............ | 378/92 |
| 2005/0036689 A1 * | 2/2005 | Mahdavieh | ............ | 382/199 |
| 2006/0013463 A1 * | 1/2006 | Ramsay et al. | ............ | 382/132 |
| 2006/0109953 A1 * | 5/2006 | Walter et al. | ............ | 378/5 |
| 2006/0285630 A1 * | 12/2006 | Bernhardt et al. | ............ | 378/4 |
| 2007/0098242 A1 * | 5/2007 | Wiemker et al. | ............ | 382/131 |
| 2007/0189443 A1 * | 8/2007 | Walter et al. | ............ | 378/4 |
| 2008/0043918 A1 * | 2/2008 | Sundaram | ............ | 378/119 |
| 2009/0147919 A1 * | 6/2009 | Goto et al. | ............ | 378/86 |

* cited by examiner

*Primary Examiner* — Bhavesh M Mehta
*Assistant Examiner* — Tahmina Ansari
(74) *Attorney, Agent, or Firm* — Harness, Dickey & Pierce, P.L.C.

(57) ABSTRACT

A method and a device are disclosed for segmenting at least one substance in an x-ray image. In at least one embodiment of the method, two attenuation values relating to different energies of an x-radiation are acquired in relation to each pixel. The pixels are mapped into a two-dimensional feature space on the basis of the acquired attenuation values, and there is subsequently determined as assessment variable from the mapping of an image environment respectively assigned to the pixels the number of those pixels that fall in a classification region assigned to the substance. It is then possible to calculate in a simple way on the basis of the assessment variable a segmented image that contains the substance and in which misclassification can largely be avoided by taking account of the neighborhood relationship of the pixels.

17 Claims, 4 Drawing Sheets

METHOD AND DEVICE FOR SEGMENTING AT LEAST ONE SUBSTANCE IN AN X-RAY IMAGE

PRIORITY STATEMENT

The present application hereby claims priority under 35 U.S.C. §119 on German patent application number DE 10 2005 049 602.4 filed Oct. 17, 2005, the entire contents of which is hereby incorporated herein by reference.

FIELD

The invention generally relates to a method and/or a device for segmenting at least one substance in an x-ray image.

BACKGROUND

Methods for segmenting x-ray images are known in principle. They can be used for diagnostic purposes to identify image regions in an x-ray image in which only a specific substance, for example bone or contrast medium, is mapped. The segmentation is usually performed on the basis of a modified image that is obtained by respectively determining two attenuation values relating to two differently set energies of an x-radiation in relation to each pixel, and subsequently subtracting them from one another in a weighted fashion.

Because of the fact that the absorption coefficients depend differently on energy from substance to substance, given an appropriate selection of the weighting coefficients this procedure assigns high intensity values in the modified image only to those pixels that are to be assigned to a specific substance. The pixels potentially belonging to a specific substance are segmented by means of a pixel-related threshold value comparison of the individual intensity values with a threshold value.

In many situations, however, such a threshold value comparison leads to an erroneous result, since the attenuation values can be falsified by measurement noise such that the threshold value criterion for segmenting a pixel is not fulfilled despite the presence of the substance.

U.S. Pat. No. 6,754,298 B2 discloses a reconstruction method in which there is calculated from a plurality of measurements acquired in relation to different energy spectra of the x-radiation an image in which the components of the object are illustrated in conjunction with a reduced noise component. The reconstruction method is based on an iterative reconstruction algorithm that requires long computing times and also takes account of the diversity of the energy spectra used to acquire the measurements when calculating the result image.

SUMMARY

In at least one embodiment of the present invention to specify a method and a device for segmenting an x-ray image with the aid of which it is possible for at least one substance in an x-ray image to be segmented stably in a simple way.

The inventors have found that the result of the segmentation in an x-ray image, in at least one embodiment, is improved when for the purpose of segmentation not only a single pixel, but a number of pixels are evaluated in a local image environment assigned to the pixel. The evaluation of a number of pixels in a local environment is advantageous because the image structures of a specific substance that are to be segmented extend beyond a certain image region such that it is to be assumed with a high probability that neighboring pixels are to be assigned to the same substance. Thus, the spatial relationship of the pixels that is present in the x-ray image is also taken into account by the inclusion of an image environment.

According to at least one embodiment of the invention, the method for segmenting at least one substance in an x-ray image includes the method steps, in which two attenuation values relating to different energies of an x-radiation are acquired in relation to each pixel, in which the pixels of the x-ray image are mapped into a two-dimensional feature space on the basis of the acquired attenuation values, the feature space having at least one first classification region to which the at least one substance is uniquely assigned, in which the number of those pixels that are mapped into the classification region is determined as assessment variable from the mapping into the feature space of an image environment of the x-ray image respectively assigned to the pixels, and in which a segmented image is calculated by carrying out a threshold value comparison with a threshold value on the basis of the assessment variable relating to each pixel.

Thus, in at least one embodiment, the segmentation includes a statistical evaluation of the classification results of locally neighboring pixels. The more pixels that fall into the same classification region owing to a mapping into the feature space or the larger the assessment variable for the classification region, the greater the probability that the pixel considered likewise belongs to the classification region and thus to a specific substance. The inclusion of the local image environment ensures that image regions of a specific substance can be segmented without disturbance, that is to say, in particular, without individual misclassifications of individual pixels inside the image region. Even if the individual pixel considered is not mapped inside the classification region, it is therefore possible on the basis of the overall consideration of the local image environment for the pixel to be classified as belonging to the substance.

However, the method is not limited to the segmentation of only one substance. It is likewise advantageously conceivable for a second substance, in at least one embodiment, to be segmented such that the feature space has a second classification region to which a second substance present in the x-ray image is uniquely assigned. In this case, two assessment variables that respectively represent the number of the pixels mapped into a classification region are determined in relation to each pixel on the basis of the local neighborhood. The segmentation of the two substances then requires a threshold value comparison to be carried out for each of the assessment variables.

In the case where two substances are segmented in an x-ray image, it is advantageously possible to identify in the feature space a third classification region in which a substance cannot be uniquely assigned. It is certainly known that the pixels mapped into the third classification region belong to one of the two substances. However, a unique assignment is not possible on the basis of the two acquired attenuation values. Moreover, it is possible, furthermore, to specify in the feature space a fourth classification region to which neither of the two substances is assigned.

Pixels that are mapped into this classification region do not belong uniquely to one of the two substances to be segmented. The division of the feature space into the third and fourth classification regions has the advantage that before the threshold value comparison the assessment variable can be weighted as a function of the determined number of at least one of the pixels of the image environment mapped into the third or fourth classification region. An appropriate weighting of the assessment variable ensures that a few pixels of the local neighborhood being considered can be arranged outside the image structure in the edge region of the substance to be segmented or of the image structure associated with the substance, and so there is no need in principle for all the pixels to fall into the first or second classification region.

The at least one classification region of the feature space can advantageously be determined by a simulation by virtue of the fact that two attenuation values of the substance transirradiated by the x-radiation are simulated and mapped into the feature space. In order to determine the extent of the respective classification region, it is expedient here to carry out the simulation for different transmission thicknesses and different concentrations of the substance. A wide spectrum of different variations can be covered in this case by simulation. Of course, it would likewise be conceivable, however, to determine the classification regions experimentally, or to readjust or correct them as appropriate by means of the experimentally discovered results.

In an advantageous refinement of an embodiment of the invention, the assessment variable is converted into a probability by way of a transfer function before the threshold value comparison, the transfer function specifying the relationship between the number of the mapped pixels and the probability of the presence of the substance. This procedure is intended, in particular, to take account of the state of affairs that the number of the mapped pixels can be in a nonlinear relationship with the probability of the presence of the substance.

The first substance for which a segmentation is undertaken in the x-ray image is preferably bone. The second substance is preferably a contrast medium. The important image structures that a doctor has to examine during a diagnosis can easily be identified in an x-ray image with the two segmented substances.

The energy of the x-radiation can be varied in a simple way via the set tube voltage of an x-ray machine. The first energy of the x-radiation can therefore be generated in a particularly simple fashion given a set tube voltage of 80 kV. A second energy, different therefrom, of the x-radiation can advantageously be generated given a set tube voltage of 140 kV.

The image environment considered in relation to each pixel advantageously includes at least three pixels in each image dimension such that a sufficiently reliable assessment can be undertaken by way of the statistical evaluation of the classification results of at least 9 pixels. When selecting the dimension of a local image environment, it is necessary, in particular, to pay heed to the resolution of the image structures to be extracted. Thus, for example, it is conceivable to select the local image environment as a function of the anatomical conditions prior to the segmentation. Blood vessels, which have a substantially lesser extent in the x-ray image, must, for example, be segmented by using a local image environment that is substantially smaller when compared to the examination of bones.

BRIEF DESCRIPTION OF THE DRAWINGS

Example embodiments of the invention and further advantageous refinements of the invention are illustrated in the following schematics, in which.

DETAILED DESCRIPTION OF THE EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described.

Figure 1:
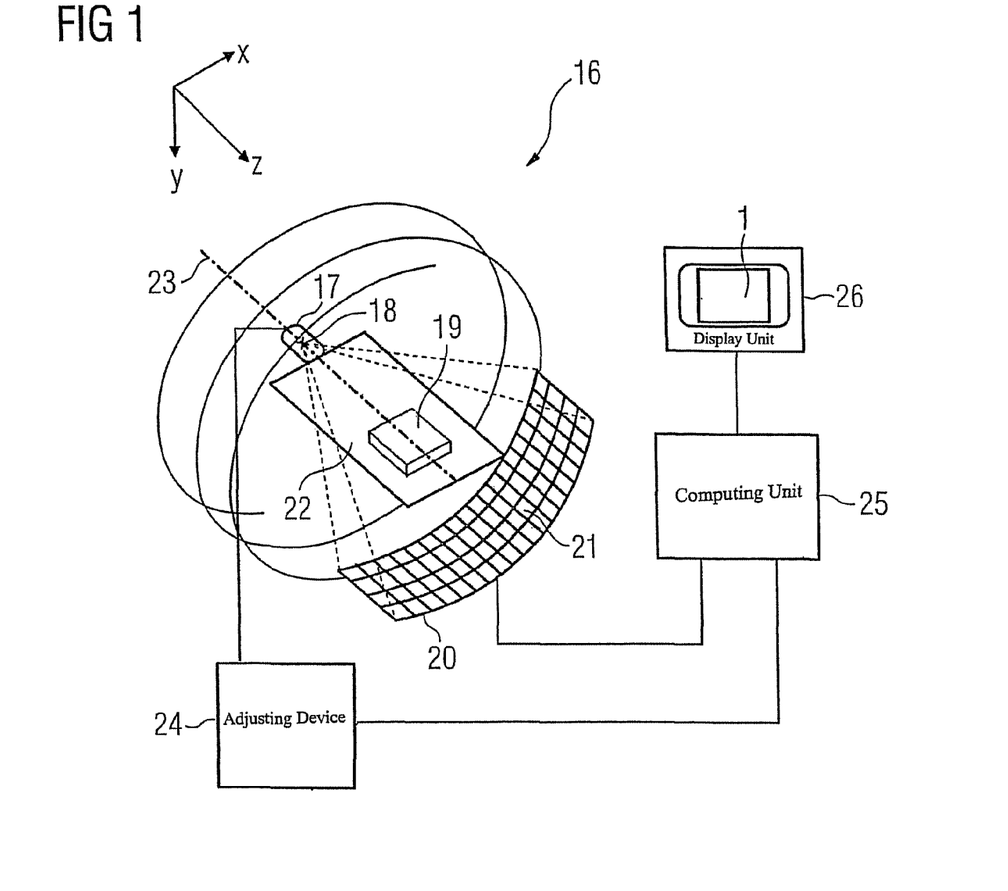
FIG. 1 shows in an illustration that is partially perspective and partially in the form of a block diagram a computed tomography unit that is suitable for executing the method according to an embodiment of the invention for segmenting at least one substance in an x-ray image.

The method according to an embodiment of the invention for segmenting at least one substance in an x-ray image 1 can be executed using an x-ray machine known per se in the form of a computed tomography unit 16 as illustrated in FIG. 1 in a way that is partially perspective and partially in the form of a block diagram. Such a computed tomography unit 16 has at least one x-ray source here, in the form of an x-ray tube 17, having at least one focus 18 that generates an x-ray beam that passes through an object 19 and subsequently impinges on a detector 20 situated opposite. The detector 20 comprises a plurality of detector elements 21, of which only one is provided with a reference numeral. Each detector element 21 generates an attenuation value dependent on the intensity of the attenuated x-radiation. A projection of the object 19 is formed at a specific scanning position of the x-ray tube 17 and of the detector 20 by means of a set of attenuation values of all the detector elements 21.

The recording system formed from the x-ray tube 17 and the detector 20 is arranged on a rotatable gantry (not illustrated). In one of a number of possible operating modes, the recording system rotates about the object 19, for example about a patient. A multiplicity of projections from different directions of projections that are required to reconstruct an x-ray image 1 in the form of a tomogram or volume image are acquired by rotating the recording system. Such two-dimensional or three-dimensional images can serve, for example, as input image for the method according to an embodiment of the invention. The object 19 can be spirally scanned not only in a slice but in a volume that is larger than the extent of the detector 20 by continuously advancing a table plate 22 along the system axis 23. A simple variant of the spiral scanning resides in carrying out the feed sequentially such that a feed takes place after each 360° scan, and the actual scanning is undertaken in the state of rest of the object 19. Both variants are applicable in the method according to an embodiment of the invention.

The tube voltage of the x-ray tube 17 can be set to a specific voltage value by means of an adjusting device 24 in relation to each projection or to each revolution of the recording system. It is possible in this way to generate projections in relation to different spectra of the x-radiation or to different energies E1, E2 of the x-radiation. Of course, it would also be conceivable as an alternative thereto to acquire the projections in relation to different energies E1, E2 of an x-radiation by means of an energy-selective detector in conjunction with a permanently set tube voltage. This would have the advantage of being able to dispense with an alternating adjustment of an operating parameter of the computed tomography unit 16. It may be pointed out, furthermore, that both single row and multirow detectors can be used. Moreover, it is also possible to use one or more x-ray tubes respectively having one or more foci with, in turn, a single or a number of moving or stationary detectors.

In this example embodiment, attenuation values 3, 4 relating to two different energies E1, E2 of the x-radiation are generated in relation to each detector element 21 by way of a corresponding alternating adjustment of the tube voltage, referred to the same direction of projection, in order to segment the substance in an x-ray image 1. The first energy E1 of the x-radiation can be generated, for example, given a set tube voltage of 80 kV, and the second energy E2 can be generated given a set tube voltage of 140 kV. In principle, however, it is possible to select for the purpose of generating different energies of x-radiation any pair of tube voltages in the case of which the difference in the absorption for the two generated energies is sufficiently large between the substances.

The acquired projections are subsequently passed on to a computing unit 25, and a reconstruction method known per se is used to reconstruct them to form an x-ray image 1 that can be displayed on a display unit 26. Two attenuation values 3, 4 assigned to the two different energies E1, E2 of the x-radiation are available in each case for each pixel 2 of the x-ray image 1. Different substances have different absorption properties in relation to x-radiation, depending on the energy. For reasons of clarity, only one pixel of the x-ray image 1 has been provided with a reference numeral.

Pixels 2 that belong to the same substance or to the same image structure are ideally mapped onto the same point in a feature space 5 in which the two attenuation values 3, 4 relating to different energies E1, E2 are plotted. Taking account of the state of affairs that the substance is present in the object 19 at different concentrations and in different transmission thicknesses, it is possible to assign to a substance in the feature space 5 not only a point, but a classification region 6 having a certain extent and by way of which the substance is uniquely represented.

It can therefore be detected under ideal precondition whether the pixel 2 belongs to the substance or not by mapping and assessing an individual pixel 2 of the x-ray image 1 in the feature space. The result of the individual pixel-related comparison would be a segmented x-ray image 13 in which the substance is extracted. However, in practice the pixel-related segmentation frequently leads to a defective segmentation result, since individual attenuation values 3, 4 can be falsified by measurement noise or electronic noise. The segmented x-ray image 13 thus obtained has interference that can substantially complicate a diagnosis.

Figure 2:
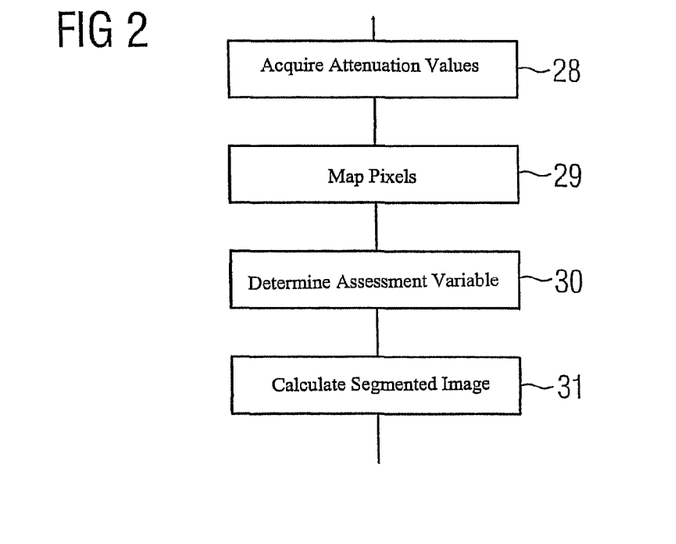
FIG. 2 shows the method for segmenting the substance in outlined form.

The inventors have realized that the image perturbations and the misclassifications 27 can be substantially diminished whenever not only the classification result of an individual pixel 2, but the classification result of a local image environment 10 of the pixel 2 are taken into account during segmentation. The segmentation according to an embodiment of the invention substantially comprises the steps shown in FIG. 2, which can be executed on the computing unit 25:

first step 28: acquisition of the two attenuation values 3, 4 relating to different energies E1, E2 of the x-radiation in relation to each pixel 2 of the x-ray image 1.

Second step 29: mapping the pixels 2 into the two-dimensional feature space 5, the feature space 5 having at least the first classification region 6 to which at least one substance is uniquely assigned.

Third step 30: determining an assessment variable 11 from the number of those pixels of a local image environment 10 of the pixel 2 considered that are mapped into the classification region 6.

Fourth step 31: calculating a segmented image 14 by carrying out a threshold value comparison with a threshold value on the basis of the assessment variable 11 relating to each pixel 2.

The segmentation thus includes a threshold value comparison for each pixel. The comparison takes place on the basis of the determined assessment variable 11. By contrast with a pixel-related segmentation of the x-ray image 1, account is taken during the present invention of the local image environment 10, the determined assessment variable 11 including an item of topological information as to how many pixels in the local neighborhood have the same properties.

Thus, taking account of the local neighborhood suppresses individual and minor misclassifications 27. The size of the local image environment 10 taken into account in relation to each pixel 2 is substantially a function of the local extent of that substance or image structure in the x-ray image 1 that is to be extracted. In principle, a relatively small local image environment 10 is to be selected in the case of small image structures. Thus, for example, a local image environment 10 of 3×3 pixels can be used for segmenting a contrast medium that is flowing through small blood vessels. The pixel 2 respectively taken into account during the segmentation is preferably arranged centrally relative to the local image environment 10. The selection of a local image environment 10 could be performed via a user interface provided for the purpose, such that the local image environment 10 suitable for the situation can be selected from examination to examination.

Figure 3:
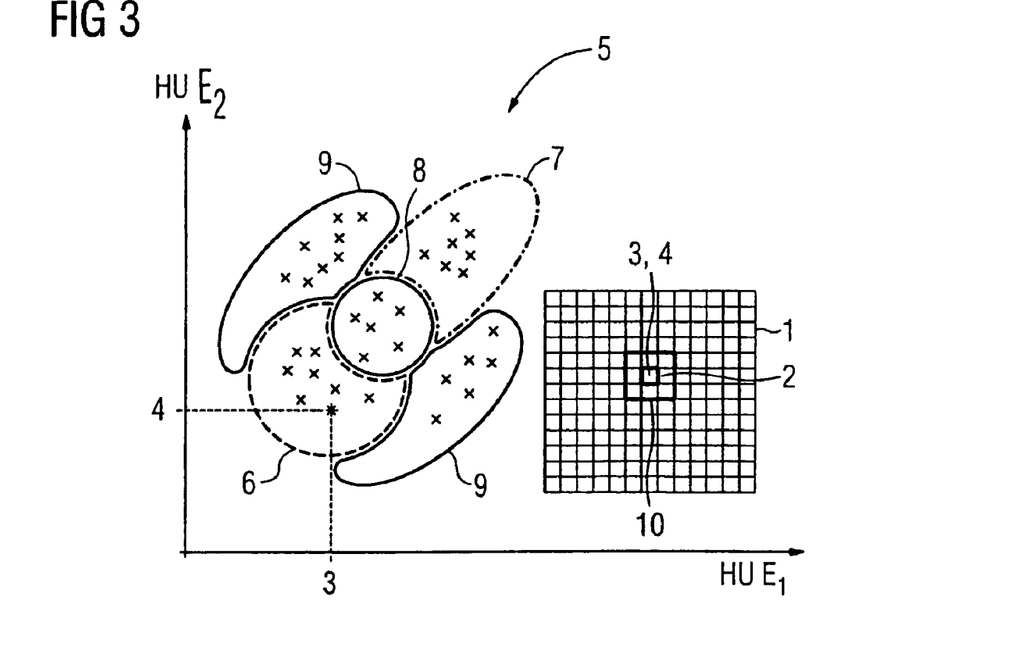
FIG. 3 shows a two-dimensional feature space that has different classification regions and into which pixels of the x-ray image are mapped.

Of course, it is possible in the case of an embodiment of the present invention to segment not only one substance, but a number of substances simultaneously in the x-ray image 1. By way of example, FIG. 3 shows a two-dimensional feature space 5 that has different classification regions 6, 7 for segmenting two substances. The two dimensions of the feature space 5 correspond to the attenuation values relating to differently set energies E1, E2 of the x-radiation. It is possible to distinguish the following classification regions with the aid of which the following assignment of the pixels is defined:

first classification region 6: certainly the first substance, second classification region 7: certainly the second substance, third classification region 8: certainly one of the two substances, it being uncertain whether the first or second substance is present, fourth classification region 9: certainly neither of the two substances.

The classification regions 6, 7, 8, 9 can be determined in this case in advance by means of a simulation, there being simulated in detail: the spectrum, generated by the x-ray tube 17, of the x-radiation relating to the corresponding energy E1, E2; the absorption of the x-radiation as a function of the substance and the energy E1, E2; and the signal, converted in the detector 20, of the incident x-radiation. The classification regions are obtained by varying the concentration and the transmission thickness of the substance considered. However, it would likewise be conceivable to determine the classification regions 6, 7, 8, 9 by an experiment.

Pixels that are mapped into the fourth classification region 9 are not uniquely assigned to the substances. The number of the pixels, mapped into this classification region 9, of the image environment 10 considered enable the assessment variable 11 to be capable of weighting before the threshold value comparison. An appropriate weighting of the assessment variable 11 takes account of the state of affairs that a few pixels of the local neighborhood considered can be arranged outside the image structure in the edge region of the substance to be segmented or of the image structure associated with the substance. If, for example, it is established that 4 of 9 possible pixels uniquely fail to display either of the two substances, it may be assumed with a certain probability that the pixel 2 considered is an edge pixel. It can be expedient in this case to increment the assessment variable 11 such that the threshold value criterion is fulfilled. For example, it will be possible to add to the assessment variable 11 a certain percentage, for example 50%, of the pixels falling into the fourth classification region 9.

Figure 4:
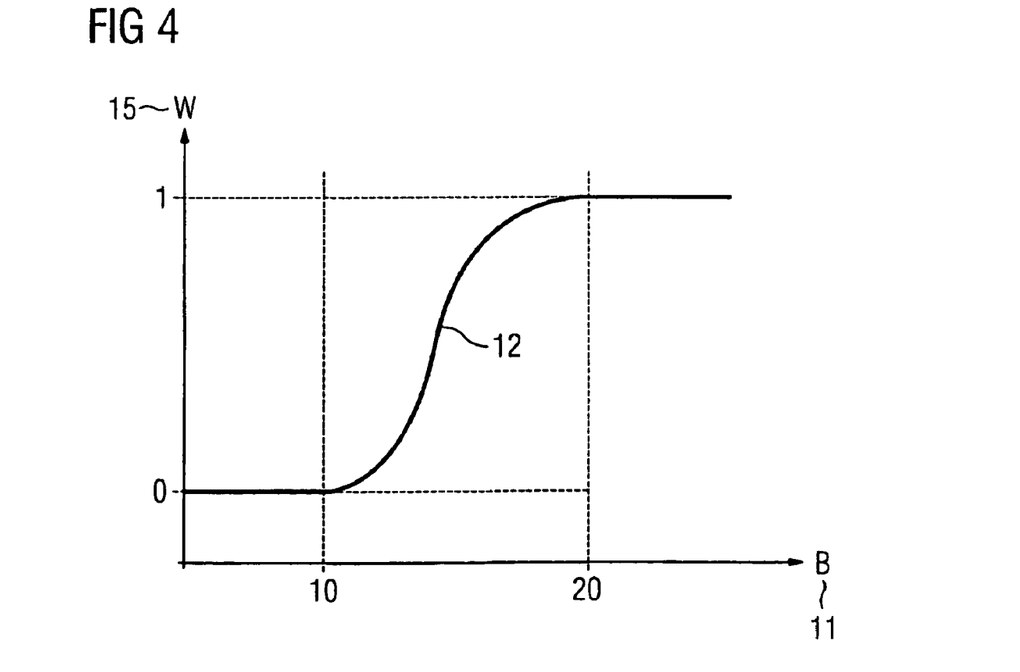
FIG. 4 shows a diagram illustrating a transfer function for determining a probability of the presence of a substance as a function of a reference variable determined from a local image environment.

It is to be provided before the threshold value comparison that the assessment variable 11 is converted into a probability 15 by way of a transfer function 12. The transfer function 12 in this case specifies the relationship between the number of the mapped pixels and the probability 15 of the presence of the substance. The transfer function 12 is shown by way of example in FIG. 4 and can be determined by including prior knowledge. Should experience show, for example, that the substance is always present in the case of 20 pixels mapped into the first or second classification region 6, 7, respectively, and that the substance is always absent in the case of 10 pixels, then the reference variable is projected onto a scale in the case of which values under 10 vanish, and values over 20 undergo a transition into unity. For example, a smooth transition is achieved between the two values by using a function that behaves as cos 2(x).

A further improvement in the segmentation result can be attained when the segmentation is combined by using a further scalar decision criterion such as is described, for example, in the German application (not a prior publication) of file reference 102005 037367.4 entitled "Verfahren für eine Röntgeneinrichtung" ["Method for an x-ray machine"], the entire contents of which are incorporated herein by reference. For example, FIG. 5 is used to describe a method of calculating a parameter H as a measure of a homogeneity of a substance 2'.

Two X-ray images 5', 6' are acquired for at least two different energies E1', E2' of an X-radiation. The X-ray images 5', 6' respectively include attenuation values Di(E1'), Di(E2'), where i=which illustrate an attenuation of the X-radiation passing through the object, N representing the number of pixels present in an image area 1'.

Subsequently, pairs of measured values (D1(E1'), D1(E2')), ..., (DN(E1'), DN(E2')) are formed for corresponding pixels from the attenuation values Di(E1') of an X-ray image 5 acquired in relation to the first energy E1' of the X-radiation, and from the attenuation values Di(E2') of an X-ray image 6' acquired in relation to the second energy E2' of the X-radiation.

Figure 5:
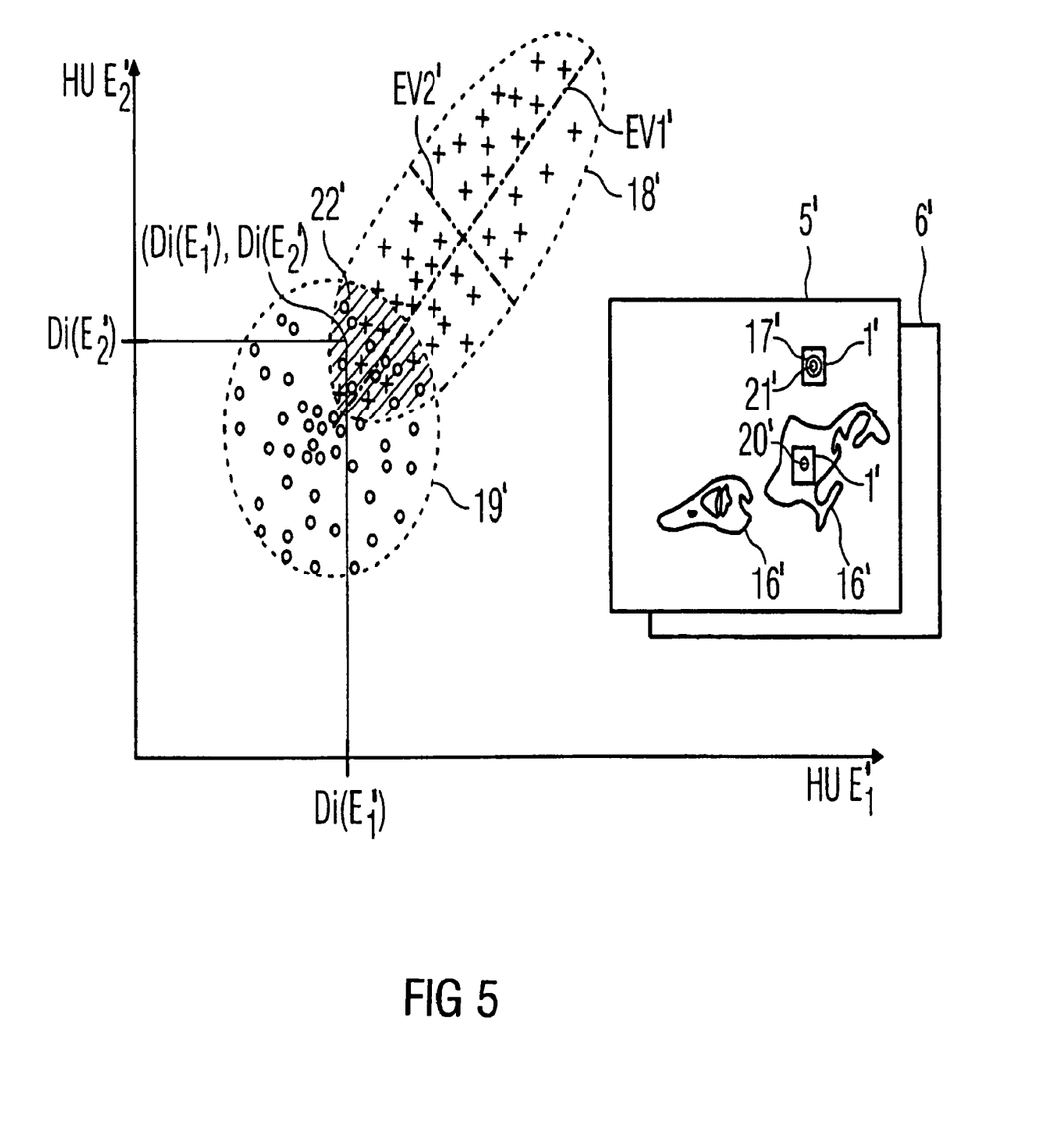
FIG. 5 shows a statistical distribution of pairs of measure values that are respectively formed from two attenuation values of corresponding pixels acquired in relation to different energies.

As shown in FIG. 5, a pair of measured values (Di(E1'), Di(E2')) of a two-dimensional feature space having the two space axes $HU_{E1'}, HU_{E2'}$. Two different substances 2', 3', specifically bone and iodine, are imaged in the example shown onto two different regions 16', 17' in the two X-ray images 5', 6'. The pairs of measured values of the image area 1' are imaged in the feature space at the positions of two different pixels 20', 21', the image area 1' lying at the position of the first pixel 20' in the region 16' of the first substance 2', namely bone, and at the position of the second pixel 21' in the region 17' of the second substance 3', namely iodine. As illustrated in FIG. 5, the two substances 2', 3' are partly imaged into the same zone 22' of the feature space such that the pixels cannot always be uniquely assigned to a substance 2'; 3' on the basis of the individual pair of measured values (Di(E1'), Di(E2')). In particular, in this zone 22' of the feature space there is a need for an additional segmentation criterion with the aid of which an improved classification of pixels can be carried out.

Because of the inhomogeneity of the first substance 2', namely bone, the pairs of measured values of the image area 1' about the first pixel 20', as shown in FIG. 5, are not imaged into a circle 19', but into an ellipse 18' having a preferred direction in feature space.

By contrast thereto, in the image area 1', iodine which is likewise mixed with blood during investigations and is used as contrast medium in order to visualize vessels, is distributed virtually homogeneously about the second pixel 21'. The pairs of measured values (Di(E1'), Di(E2')) of the second substance 3', namely iodine are imaged in the circle 19' in the feature space, for this reason.

The parameter H at the position of a pixel 20' or 21' is calculated as a measure of the homogeneity from the statistical distribution of the pairs of measured values (D1(E1'), D1(E2')), ..., (DN(E1'), DN(E2')) in image area 1'.

In order to determine the statistical distribution, the attenuation values of the pairs of measured values can respectively be written as a vector in a separate fashion for the two different energies:

$$V_{E1'} = (D1(E1'), D2(E1'), \ldots, DN(E1')) \quad (1)$$

$$V_{E2'} = (D1(E2'), D2(E2'), \ldots, DN(E2')), \quad (2)$$

$V_{E1'}$ and $V_{E2'}$ being the two vectors of the attenuation values in relation to different energies E1', E2' of the X-radiation, Di(E1') to Di(E2') being the attenuation value of the ith pixel of the image area 1' acquired at 80 kV and 140 kV, respectively and N being the number of pixels present in the image area 1'.

By means of comparing threshold values, the attenuation values Di(E1'), Di(E2') that do not belong to the substance 2'; 3', specifically bone or iodine, respectively, of interest here are identified and removed before the calculation. Interfering attenuation values can be removed, for example, by setting their respective value to zero.

The attenuation values Di(E1'), Di(E2') are subsequently mean-corrected by calculating a mean D1M' and D2M' of the attenuation values separately from one another for the energies E1' and E2', and subtracting the calculated mean from the vector components:

$$V_{E1'} = (D1(E1')-D1M', D2(E1')-D1M', \ldots, DN(E1)-D1M') \quad (3)$$

$$V_{E2'} = (D1(E2')-D2M', D2(E2')-D2M', \ldots, DN(E2')-D2M') \quad (4)$$

The two modified vectors $V'_{E1'}$ and $V'_{E2'}$ subsequently describe the centroid-corrected coordinates of the distribution. The covariance matrix, which reproduces the eccentricity of the distribution, can be specified by analogy with the moment of inertia in classical mechanics:

$$M = \begin{pmatrix} \sum V'^2_{E1'} & \sum V'_{E1'} * \sum V'_{E2'} \\ \sum V'_{E2'} * \sum V'_{E1'} & \sum V'^2_{E2'} \end{pmatrix} \quad (5)$$

M being the covariance matrix formed from the vectors $V'_{E1'}$ and $V_{E2'}$.

Two Eigenvalues EV1', EV2' of the covariance matrix can be determined with the aid of a principle axis transformation carried out using the Jaboci method, for example.

The information relating to the two Eigenvalues EV1', EV2' of the principle axes is used to obtain the additional segmentation criterion that is required for the improved segmentation of a substance 2'; 3' in an X-ray image. Given a homogeneous distribution of the second substance 3', namely iodine in the image area 1', as is the case, for example, for the contrast medium in the form of iodine in a vessel, the two Eigenvalues EV1', EV2' will differ from one another only slightly. Assuming an uncorrelated measurement noise, the pairs of measured values Di(E1')Di(E2') are distributed in a circle about a point in feature space.

In the case of an inhomogeneous distribution of the first substance 3', namely bone, the two principle axes will differ from one another substantially more plainly.

The following ratio of the two Eigenvalues EV1', EV2', therefore supplies a scalar parameter H that can be used as a measure of the homogeneity of the substance as an additional decision criterion:

$$H = \text{Min}(EV1', EV2')/\text{Max}(EV1', EV2'), \quad (6)$$

EV1' and EV2' being the two Eigenvalues of the principle axes of the distribution, and H representing the parameter of the homogeneity of the substance in the image area.

The larger the parameter H, the greater is thus the homogeneity of the substance in the image area.

It would be conceivable through the additional use of an eigenvalue criterion also to take account as well of the information relating to the local homogeneity during the segmentation. Thus, for example, it would be conceivable to set the segmentation more sensitively in the event of severe homogeneity. The sensitivity can, for example, be regulated by adding a value dependent on the homogeneity through the assessment variable 11 or the probability 15.

Figure 6:
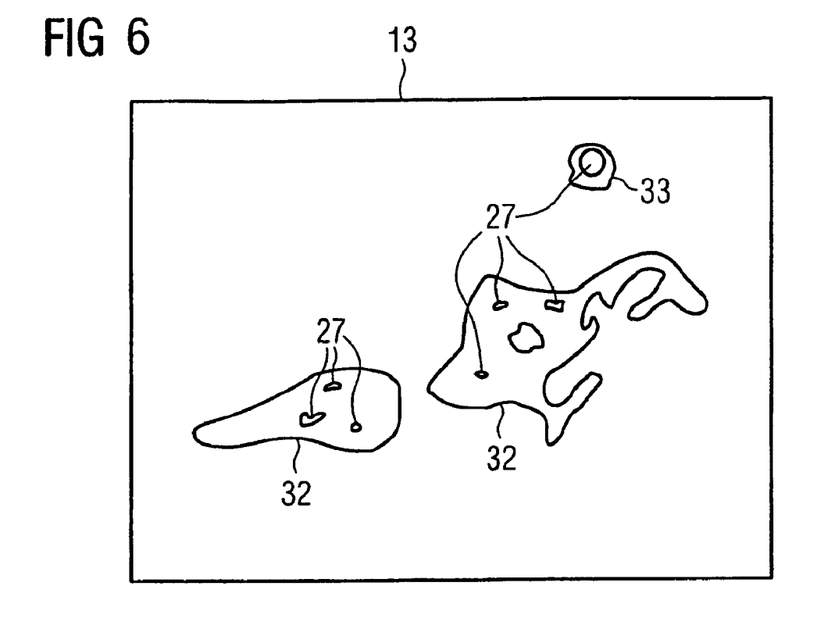
FIG. 6 shows a first segmented image leaving a neighborhood criterion out of account.
Figure 7:
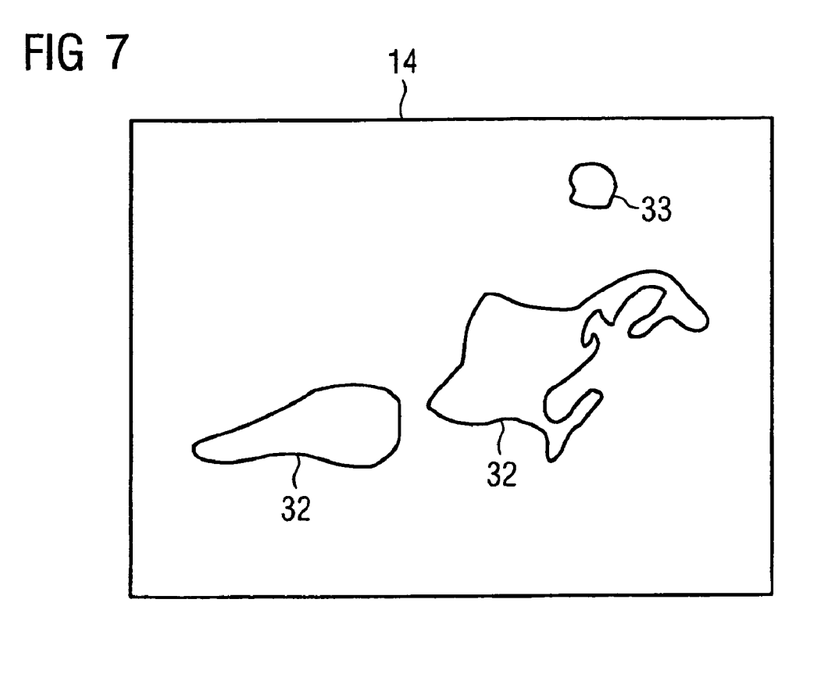
FIG. 7 shows a second segmented image taking account of the neighborhood criterion.

FIGS. 6 and 7 illustrate the difference in the result between a pixel-related segmentation and an image environment-related segmentation for two substances, specifically bone and iodine. Bone is respectively mapped into an image region provided with the reference numeral 32, and iodine is mapped into an image region provided with the reference numeral 33. As may be gathered from FIG. 5, there are present in the segmented image 13, which is obtained by a pixel-related segmentation, image perturbations that arise through misclassifications 27 of individual pixels 2 whose attenuation values 3, 4 are perturbed by measurement noise or electronic noise.

By contrast, FIG. 7 shows the result of a segmentation in the form of a segmented image 14 in the case of which in relation to each pixel 2 account is respectively also taken of a local image environment 10 assigned thereto. It is largely possible to avoid image perturbations by taking account of the topological information and/or the spatial distribution of the substances in the x-ray image 1.

At least one embodiment of the invention can be summarized as follows:

At least one embodiment of the invention relates to a method and a device for segmenting at least one substance in an x-ray image 1, in which two attenuation values 3, 4 relating to different energies E1, E2 of an x-radiation are acquired in relation to each pixel 2, in which the pixels 2 are mapped into a two-dimensional feature space 5 on the basis of the acquired attenuation values 3, 4, and in which there is subsequently determined as assessment variable 11 from the mapping of an image environment 10 respectively assigned to the pixels the number of those pixels that fall in a classification region 6 assigned to the substance, such that it is possible to calculate in a simple way on the basis of the assessment variable 11 a segmented image 14 that contains the substance and in which misclassification can largely be avoided by taking account of the neighborhood relationship of the pixels 2.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for segmenting at least one substance in an x-ray image, comprising:
    acquiring two attenuation values relating to different energies of an x-radiation, in relation to each pixel;
    mapping the pixels of the x-ray image into a two-dimensional feature space on the basis of the acquired attenuation values, the feature space including at least one first classification region to which the at least one substance is uniquely assigned;
    determining the number of the pixels that are mapped into the classification region as an assessment variable, from the mapping into the feature space of an image environment of the x-ray image respectively assigned to the pixels, a size of the image environment being based on the at least one substance; and
    calculating a segmented image, by carrying out a threshold value comparison with a threshold value on the basis of the assessment variable relating to each pixel.

2. The method as claimed in claim 1, wherein the feature space includes a second classification region to which a second substance present in the x-ray image is uniquely assigned.

3. The method as claimed in claim 2, wherein the feature space includes a third classification region in which a substance cannot be uniquely assigned.

4. The method as claimed in claim 2, wherein the feature space includes a fourth classification region to which neither of the two substances is assigned.

5. The method as claimed in claim 3, wherein before the threshold value comparison, the assessment variable is weighted as a function of the number of at least one of the pixels of the image environment mapped into the third classification region.

6. The method as claimed in claim 1, wherein the at least one classification region of the feature space is determined by a simulation by virtue of the fact that two attenuation values of the substance transirradiated by the x-radiation are simulated and mapped into the feature space.

7. The method as claimed in claim 1, wherein the assessment variable is converted into a probability by way of a transfer function before the threshold value comparison, the transfer function specifying the relationship between the number of the mapped pixels and the probability of the presence of the substance.

8. The method as claimed in claim 1, wherein the first substance is bone.

9. The method as claimed in claim 2, wherein the second substance is a contrast medium.

10. The method as claimed in claim 1, wherein the first energy E1 of the x-radiation is generated given a set tube voltage of 80 kV.

11. The method as claimed in claim 1, wherein the second energy E2 of the x-radiation is generated given a set tube voltage of 140 kV.

12. The method as claimed in claim 1, wherein the image environment includes at least three pixels in each image dimension.

13. A device for segmenting at least one substance in an x-ray image, comprising:
    means for acquiring two attenuation values relating to different energies of an x-radiation, in relation to each pixel;
    means for mapping the pixels of the x-ray image into a two-dimensional feature space on the basis of the acquired attenuation values, the feature space including at least one first classification region to which the at least one substance is uniquely assigned;
    means for determining the number of the pixels that are mapped into the classification region as an assessment variable, from the mapping into the feature space of an image environment of the x-ray image respectively assigned to the pixels, a size of the image environment being based on the at least one substance; and
    means for calculating a segmented image, by carrying out a threshold value comparison with a threshold value on the basis of the assessment variable relating to each pixel.

14. The method as claimed in claim 3, wherein the feature space includes a fourth classification region to which neither of the two substances is assigned.

15. The method as claimed in claim 4, wherein before the threshold value comparison, the assessment variable is weighted as a function of the number of at least one of the pixels of the image environment mapped into the fourth classification region.

16. The method as claimed in claim 14, wherein before the threshold value comparison, the assessment variable is weighted as a function of the number of at least one of the pixels of the image environment mapped into the fourth classification region.

17. A non-transitory computer readable medium including program segments for, when executed on a computer device of a radiological system, causing the radiological system to implement the method of claim 1.

* * * * *